(12) United States Patent
Speer et al.

(10) Patent No.: US 6,494,511 B1
(45) Date of Patent: Dec. 17, 2002

(54) APPARATUS AND METHOD FOR HANDLING SUBSTRATES

(75) Inventors: Ulrich Speer, Eisingen (DE); Klaus Weber, Bretten (DE)

(73) Assignee: STEAG HamaTech AG (DE)

( * ) Notice: Subject to any disclaimer, the term of this patent is extended or adjusted under 35 U.S.C. 154(b) by 0 days.

(21) Appl. No.: 09/674,180

(22) PCT Filed: Apr. 14, 1999

(86) PCT No.: PCT/EP99/02499

§ 371 (c)(1),
(2), (4) Date: Oct. 24, 2000

(87) PCT Pub. No.: WO99/55605

PCT Pub. Date: Nov. 4, 1999

(30) Foreign Application Priority Data

Apr. 24, 1998 (DE) .......................................... 198 18 479

(51) Int. Cl.$^7$ ................................................ B66J 15/10
(52) U.S. Cl. .............................. 294/2; 294/64.1; 294/93
(58) Field of Search .............................. 294/64.1, 64.2, 294/64.3, 16, 97, 86.4, 119.1, 2, 3, 65, 93; 901/40, 47; 156/295, 292, 538, 74; 414/941; 269/21, 48.1

(56) References Cited

U.S. PATENT DOCUMENTS

| | | | | |
|---|---|---|---|---|
| 4,726,615 A | * | 2/1988 | Goldberg | 294/16 |
| 4,960,268 A | * | 10/1990 | Sekiguchi et al. | 269/43 |
| 5,000,651 A | * | 3/1991 | Akagawa et al. | 294/86.4 |
| 5,201,913 A | * | 4/1993 | Vliet | 294/64.1 |
| 5,503,446 A | * | 4/1996 | De Jong | 294/94 |
| 5,505,509 A | * | 4/1996 | Vance | 294/16 |
| 5,669,562 A | * | 9/1997 | Reising et al. | 294/97 |
| 5,803,521 A | * | 9/1998 | Zejda et al. | 294/97 |
| 5,913,653 A | * | 6/1999 | Kempf | 414/226 |
| 5,931,518 A | * | 8/1999 | Pirker | 294/119.1 |
| 5,993,592 A | * | 11/1999 | Perego | 156/292 |
| 6,179,031 B1 | * | 1/2001 | Rack et al. | 188/52 |
| 6,264,804 B1 | * | 7/2001 | Lee et al. | 204/192.12 |

FOREIGN PATENT DOCUMENTS

| | | |
|---|---|---|
| DE | 195 29 537 A1 | 2/1997 |
| DE | 197 18 471 A1 | 11/1998 |
| EP | 0 793 224 A1 | 9/1997 |
| JP | 04032045 | 4/1992 |
| WO | WO 97/43760 | 11/1997 |
| WO | WO 98/57806 | 12/1998 |

OTHER PUBLICATIONS

Article: o+p–ölhydraulik und pneumatik—22(1978) Nr 1, p. 10.

International Search Report PCT/EP99/02499 Aug. 30, 1999.

* cited by examiner

*Primary Examiner*—Christopher P. Ellis
*Assistant Examiner*—Paul T. Chin
(74) *Attorney, Agent, or Firm*—R W Becker & Associates; R W Becker

(57) ABSTRACT

An apparatus and method are provided for handling substrates that are provided with an inner hole. The apparatus includes an inner gripper in the form of an inner hole gripper, and an outer gripper that is embodied as a vacuum gripper and is provided with a ring in which are disposed a plurality of suction devices. A control unit controls the inner and outer grippers such that they are moved relative to one another, while they grasp one and the same substrate, for deforming or bending the substrate. According to the method, a first substrate is grasped by the inner hole gripper, is brought into contact with an outer gripper, and is grasped by the outer gripper. The inner hole gripper is released and moved through the hole in the first substrate and then grasps a second substrate. After releasing the second substrate, the inner hole gripper again grasps the first substrate and the inner and outer grippers are moved relative to one another to bend the first substrate, whereupon the center portion of the bent first substrate is brought into contact with the second substrate. Thereafter, the remaining portions of the first substrate are brought into contact with the second substrate.

14 Claims, 3 Drawing Sheets

APPARATUS AND METHOD FOR HANDLING SUBSTRATES

BACKGROUND OF THE INVENTION

The present invention relates to an apparatus for handling substrates having an inner hole, and includes an inner gripper and an outer gripper; the present invention also relates to a method of handling substrates that have an inner hole, according to which a first substrate is grasped by an inner hole gripper.

Methods and apparatus of this type are described, for example, in the not prepublished DE-A 197 18 471, which belongs to the assignee of the present application, and that to avoid repetition is incorporated by reference to the extent relevant to the subject matter of the present invention. With the apparatus described for adhesively joining two substrates, a plurality of apparatus are described for handling substrates, and will subsequently be designated as handlers. One of these handlers, which serves for the transport of substrates from a circular switching table to an adhesion station, is provided with an inner gripper and an outer gripper that are each embodied as a so-called vacuum gripper. This particular handler operates by first removing a first substrate from the circular switching table with the inner gripper, bringing the substrate to an adhesion station, and depositing it there. Subsequently, the handler is moved back to the circular switching table. There it takes up a second substrate with the inner gripper and brings it into contact with the outer gripper, whereby the cooperation of the inner gripper with the outer gripper produces a distortion in the second substrate. The second substrate is subsequently moved to the adhesion station, where it is placed upon the first substrate, upon which an adhesive has been applied.

With the described handler, only one substrate can be taken up and transported at any given time. Furthermore, in order to accelerate the release of the vacuum gripper, during release of the gripper not only must the vacuum be eliminated but in addition a positive air blast is applied to the substrate. In so doing, however, there exists the danger that in particular during release of the inner gripper, air will be blown in between the two substrates that are to be adhesively joined; this is undesirable since it can lead to air bubbles in the adhesive located between the substrates.

In the apparatus described in DE-A-197 18 471, inner hole grippers are also used at other locations and respectively engage an inner hole of a substrate or the substrates that are adhesively joined to one another in order to then be able to transport the substrates. However, the inner hole grippers can only receive and transport a single substrate, or a unit of order to then be able to transport the substrates. However, the inner hole grippers can only receive and transport a single substrate, or a unit of adhesively joined substrates.

DE-A-1 95 29 537 discloses an apparatus for grasping and holding a flat substrate having an inner hole, according to which a plurality of finger-like grippers that are pivotably mounted in a housing are introduced into the inner hole of the substrate and are subsequently pivoted outwardly in order to hold the substrate at the inner hole. In the publication "o+p-ölhydraulik und pneumatik"–22 (1978) Nr 1, page 10, various grippers that are pneumatically actuateable are illustrated. In this connection, among others an inner hole gripper is described. With the inner hole grippers known from DE-A-1 95 29 537 and from the publication there results the problem that in each case only a single substrate can be handled.

It is an object of the present invention to provide an apparatus and a method for handling substrates that enable the simultaneous handling of a plurality of substrates, yet are structurally straightforward and capable of being easily carried out, and also enable a high productivity. A further object of the present invention is to provide an apparatus and a method for handling substrates that have an inner hole, according to which an aforementioned type, where the inner gripper is an inner hole gripper. One advantage of embodying the inner gripper as an inner hole gripper in contrast to the previously utilized vacuum gripper is that an inner hole gripper can be rapidly and effectively released without the danger that, for example, air will be blown in between two substrates that are to be adhesively joined.

SUMMARY OF THE INVENTION

Pursuant to one very advantageous embodiment of the present invention, the inner and outer grippers are moveable relative to one another, and in particular the inner hole gripper is vertically moveable. Due to the relative movement, it is possible to first grasp a substrate that is to be taken up with one gripper, in order to be able to subsequently bring it into contact with the other gripper and to have it be grasped thereby.

The outer diameter of the inner hole gripper is advantageously smaller than the inner diameter of the inner hole of the substrates, in order to make it possible for the inner hole gripper to extend through a first substrate and to be able to engage a second substrate while the first substrate is engaged or held by the outer gripper. In order to effect a simple and effective manner of operation of the inner hole gripper, the inner hole gripper is preferably pneumatically actuateable.

Pursuant to one advantageous specific embodiment of the present invention, the inner and outer grippers can be actuated independently of one another in order to enable an increased flexibility of the apparatus during engagement of one or more substrates. Pursuant to one specific embodiment of the present invention, the outer gripper is a vacuum suction device having a plurality of suction devices disposed in a ring, with the suction devices ensuring a reliable grasping of the outer portions of the substrates. The ring advantageously has a convexly bent shape in order to bend or distort the rim portions of a substrate that has been taken up by the outer gripper, thereby making it possible, when a substrate that has been taken up in this manner is placed upon another substrate, for the central portion of the taken-up substrate to first come into contact with the substrate disposed below it, and only thereafter for the rim regions to come into contact, as a consequence of which again air pockets or bubbles can be prevented between the substrates. The apparatus is advantageously horizontally moveable for transport of the substrates.

The established object is furthermore realized by a method of the aforementioned type, according to which the first substrate grasped by the inner hole gripper is brought into contact with an outer gripper that grasps the substrate, the inner hole gripper is released, the inner hole gripper is moved through the hole in the first substrate, and a second substrate is grasped. With this method, two substrates can be simultaneously handled and, if desired, transported, thereby reducing the cycle times. Furthermore, the transport paths can be shortened since two substrates can be simultaneously transported, thus increasing the service life of the components utilized, especially of a drive. Furthermore, a precise centering results between the first substrate and the second substrate since the inner hole gripper respectively centers the substrates by being accommodated in their inner holes, and this centering is also maintained during the transfer to the outer gripper.

The bringing of the first substrate into contact with the outer gripper is advantageously effected by a vertical movement, and in particular by raising the inner hole gripper.

Pursuant to one preferred specific embodiment of the present invention, the grasping of the first and/or second substrate with the inner hole gripper is pneumatically controlled, since this enables a straightforward and precise control as well as a uniform grasping of the substrate at the inner hole.

The first substrate is preferably grasped by the outer gripper by means of a vacuum.

Pursuant to one preferred specific embodiment of the present invention, the rim portions of the first substrate are bent or deflected away from the second substrate, as a consequence of which during a subsequent placement of the first substrate upon the second substrate it is possible for the central portion of the first substrate to first come into contact with the second substrate, and only after a subsequent laying of the first substrate flat do the outer portions of the substrates come into contact with one another, thereby avoiding air bubbles between the substrates. The inner hole gripper and the outer gripper are preferably moved horizontally for the transport of the substrates that have been taken up.

BRIEF DESCRIPTION OF THE DRAWING

The present invention will subsequently be describe with the aid of the one preferred specific embodiments in conjunction with the figures, in which.

DESCRIPTION OF PREFERRED EMBODIMENTS

Figure 1:
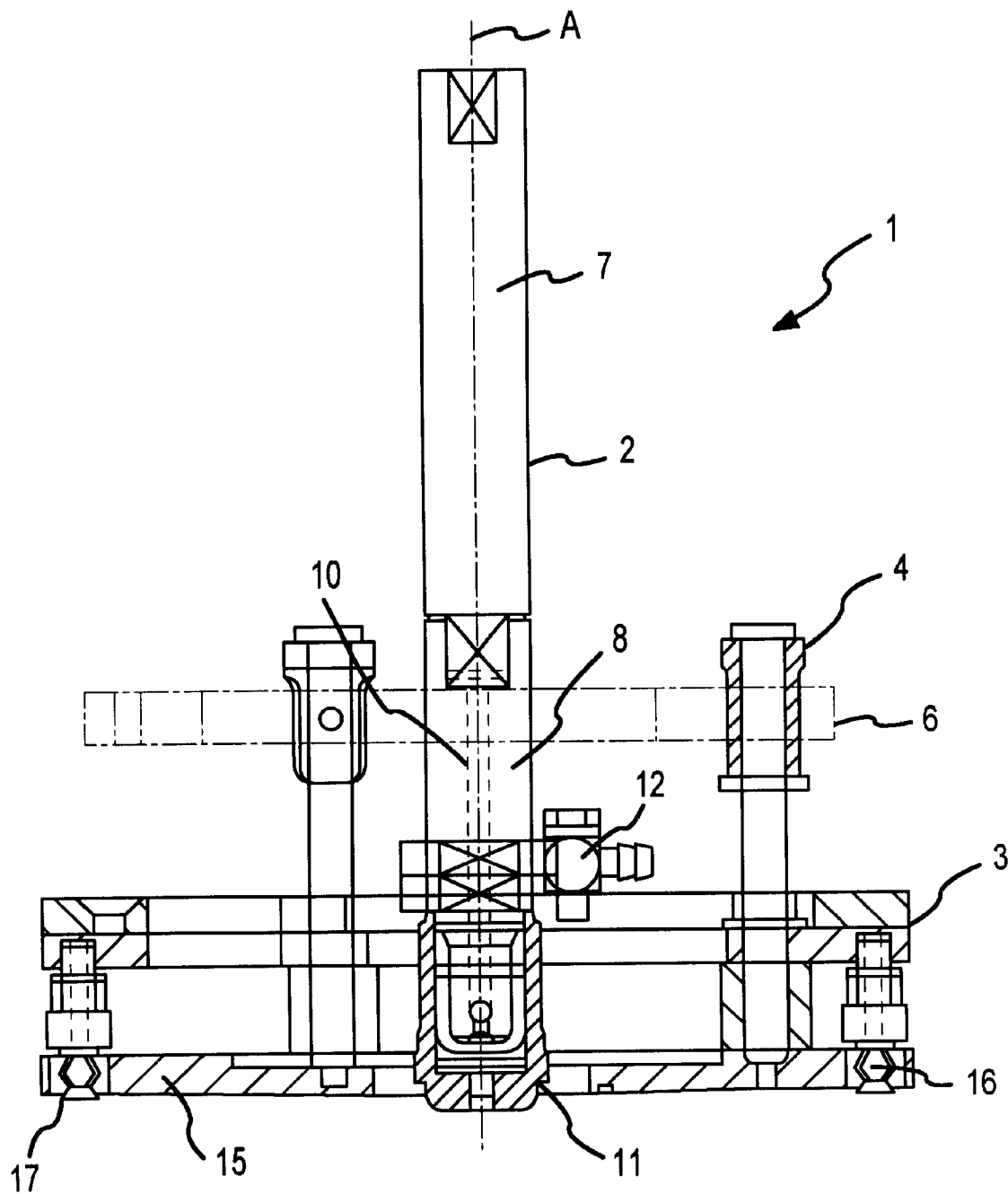
FIG. 1 a schematic sectional illustration of the inventive apparatus.

FIG. 1 schematically illustrates, in section, the essential parts of a handling apparatus, i.e. a handler, as it can be used, for example, in conjunction with an apparatus for the adhesive joining of two substrates pursuant to the aforementioned, not prepublished, DE-A-197 18 471.

The inventive handler 1 essentially comprises an inner hole gripper 2 and an outer gripper 3, which is embodied as a vacuum gripper. The outer gripper 3 is secured via a suitable securing mechanism 4 to a lifting device 5, which is illustrated only schematically. The inner hole gripper 2 is also connected to a non-illustrated lifting device in order to be able to be moved along its longitudinal axis A.

The inner hole gripper 2 has an upper, elongated shaft member 7, at the lower end of which is secured in a suitable manner an element 8 that is capable of being spread apart. The spreadable element 8 has slots 10 to enable a spreading apart of the spreadable element 8. Disposed within the element 8 is an expandable body 11 that is pneumatically or hydraulically actuated via a connector 12 that is secured to the spreadable element. In this way, the expandable body 11 expands and thereby spreads the spreadable element 8 apart in order to be able to come into engagement with an inner hole of a substrate, as will be described subsequently.

If the expandable body 11 is not pneumatically or hydraulically supplied with pressure, the spreadable element 8 is in a non-spread apart state of rest in which it is biased by non-illustrated, suitable means.

The outer gripper 3, which is embodied as a vacuum gripper, is provided with a metal ring 15, in the outer rim region of which are disposed a plurality of suction devices 16 having suction cups 17. By means of appropriate vacuum connections, the suction devices 16 can be connected to a non-illustrated low-pressure or vacuum source in order in a known manner to grasp a substrate via vacuum.

Figure 2A:
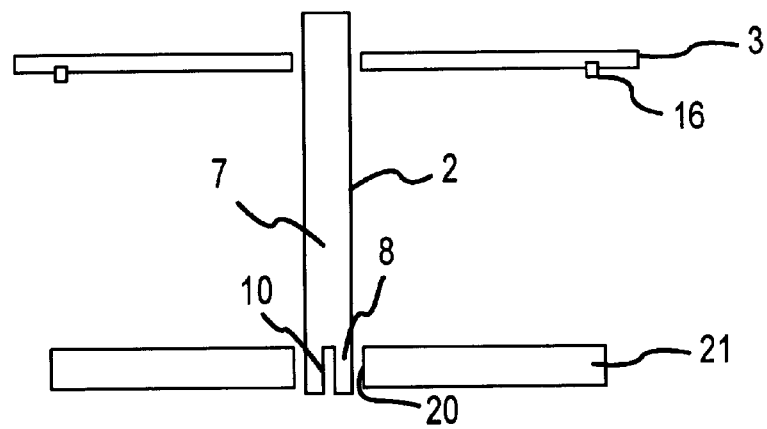
FIGS. 2a to d schematically show the functional sequence or steps pursuant to the method of the present invention.
Figure 2B:
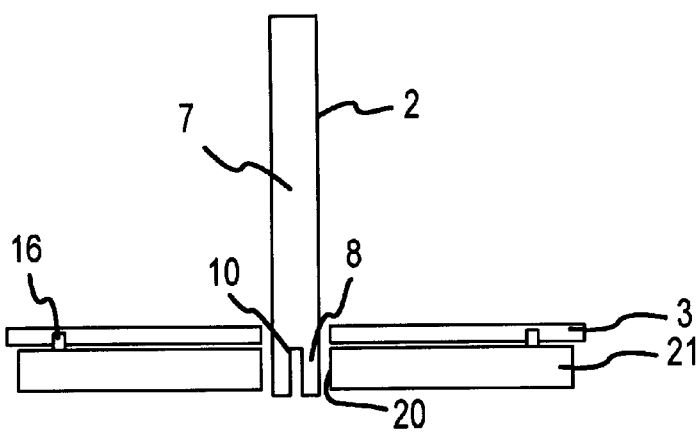
Figure 2C:
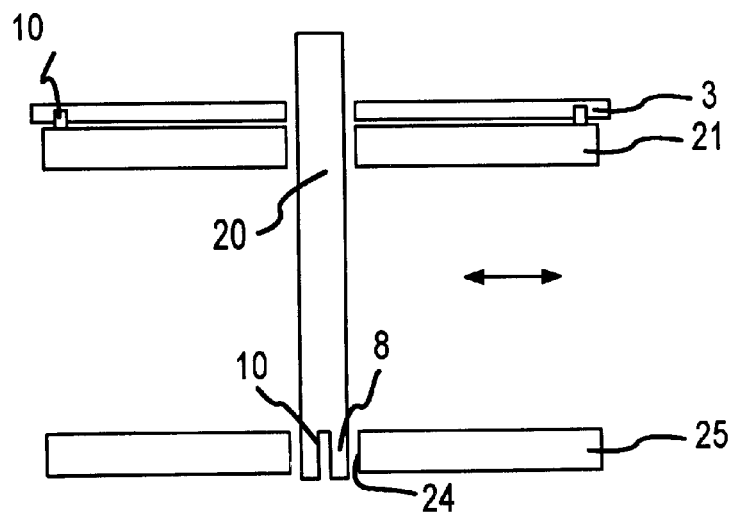

The operational apparatus of the handler 1 will now be described with the aid of FIGS. 2a to 2c. FIG. 2a schematically shows how the spreadable element 8 is introduced into the inner hole 20 of a first wafer 21. The outer gripper 3 with its suction devices 16 is disposed above the first wafer 21 and is spaced therefrom.

In this position, the spreadable element 8 is spread apart by the expandable body 11, which is not illustrated in FIG. 2a, in order to be able to come into engagement with the inner periphery of the inner hole 20 of the substrate 21. In so doing, a centering of the first substrate 21 relative to the inner hole gripper is achieved, since the latter comes uniformly into engagement with the inner periphery of the inner hole 20.

The substrate 21 is grasped by this engagement. If the substrate 21 is grasped in this manner, it is raised by the inner hole gripper 2 and is brought into contact with the suction devices 16 of the outer gripper 3. Due to the vacuum that exists at the suction devices 16, the outer regions of the substrate 21 are drawn against the suction devices 16 and are grasped. At this point in time, the inner hole gripper is released and the substrate 21 is now held only by the outer gripper 3.

Figure 2D:
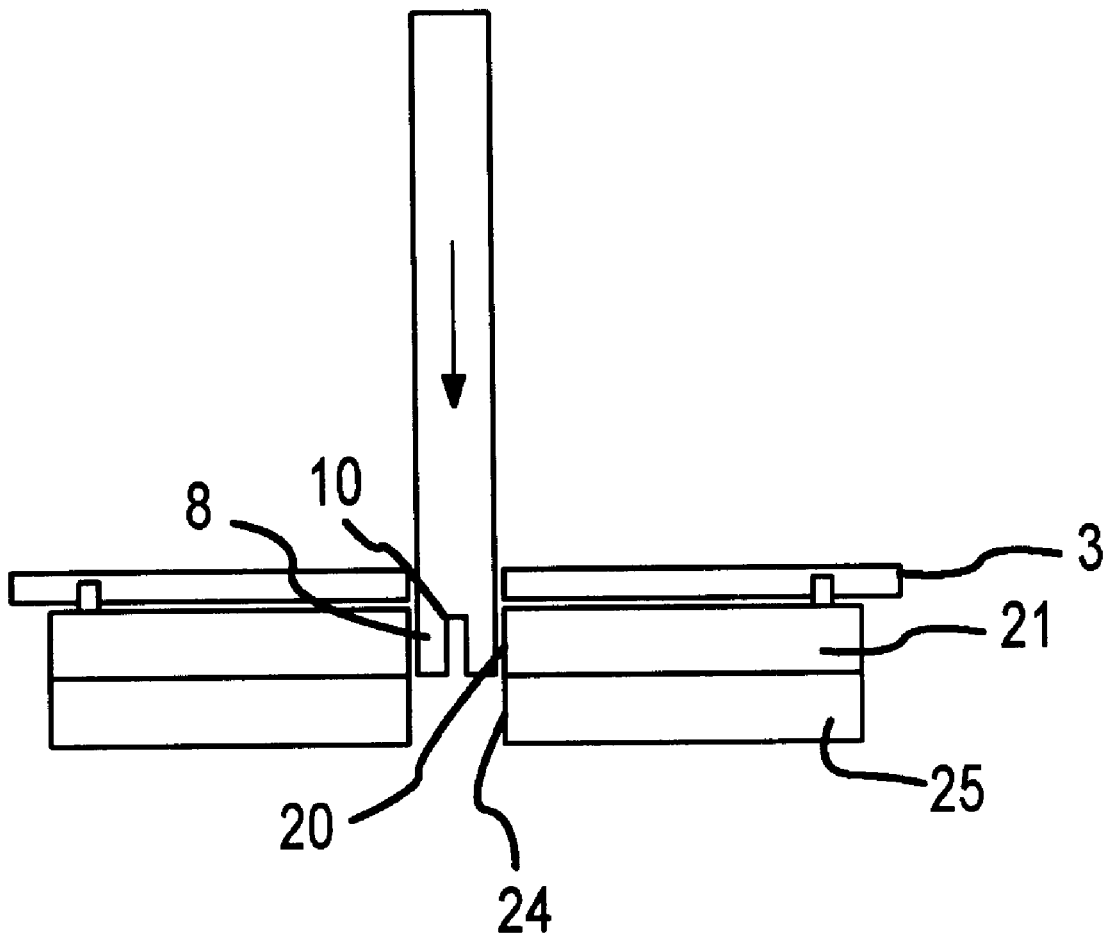

After release of the inner hole gripper the latter is moved downwardly through the inner hole 20 of the substrate 21, and in particular into an inner hole 24 of a second substrate 25. In this position, the spreadable element 8 is again spread apart by the expandable body 11 in order to be able to come into engagement with the inner periphery of the inner hole 24 of the second substrate 25. In this position, the entire handler is raised and moved horizontally in order to transport the first and second substrates 21 and 25 to another position, for example to an adhesion unit. In the adhesion unit, the second substrate 25 is deposited by releasing the inner hole gripper 2, and the surface that faces the first substrate 21 is coated with an adhesive. During this coating process, the inner hole gripper again moves upwardly, so that the spreadable element 8 is disposed in the inner hole 20 of the first substrate 21. The spreadable element is again spread apart, in the manner previously described, and comes into engagement with the inner hole 20 of the first substrate 21. By means of a small, downwardly directed movement of the inner hole gripper, the outer regions of the substrate 21, which are still held by the suction devices 16 of the outer gripper, are bent away from the lower substrate, as best shown in FIG. 2d. The first substrate 21 is then moved into contact with the lower substrate 25, whereby the middle regions of the substrates first come into contact with one another. By releasing the outer gripper the remaining regions of the substrates can then come into contact with one another, with the outer regions coming into contract last. Due to the fact that when the substates are grasped by the inner hole gripper they are each centered relative thereto, they are also deposited in a precisely centered manner relative to one another, which is particularly important during the adhesive connection of substrates.

The present invention has previously been explained with the aid of one preferred specific embodiment. However a number of embodiments and modifications are possible to one skilled in the art without thereby departing from the inventive concept. The inventive method was described in conjunction with the adhesive joining of substrates. However, the principles of the present invention are also applicable to other processes where two substrates must be handled.

In addition, the present invention is also not limited to the precise type of inner hole gripper, which only comes into engagement with the inner hole of a substrate. Rather, the inner hole gripper could also be provided with a shoulder which after passing through an inner hole of a substrate, and spreading apart of the inner hole gripper, comes into engagement with the under side of the substrate in order to carry the substrate. In place of the vacuum gripper as the outer gripper, some other gripper that grasps the outer portion of the substrates in combination with the inner hole gripper would also be possible.

The specification incorporates by reference the disclosure of German priority document 198 18 479.4 of Apr. 24, 1998 and International priority document PCT/EP99/02499 of Apr. 14, 1999.

The present invention is, of course, in no way restricted to the specific disclosure of the specification and drawings, but also encompasses any modifications within the scope of the appended claims.

What is claimed is:

1. An apparatus for handling substrates that are provided with an inner hole, said apparatus comprising:

an inner hole gripper;

an outer gripper embodied as a vacuum gripper, wherein said outer gripper is provided with a ring in which are disposed a plurality of suction devices; and a control unit for controlling said inner hole gripper and said outer gripper such that they are moved relative to one another; while they grasp one and the same substrate, for bending or deforming said substrate.

2. An apparatus according to claim 1, wherein said ring has a convexly bent shape.

3. An apparatus according to claim 1, wherein said inner hole gripper is vertically moveable.

4. An apparatus according to claim 1, wherein said inner hole gripper has an outer diameter that is less than an inner diameter of said inner hole of said substrates.

5. An apparatus according to claim 1, wherein said inner hole gripper is pneumatically actuateable.

6. An apparatus according to claim 1, wherein said inner and outer grippers are actuateable independently of one another.

7. An apparatus according to claim 1, wherein said apparatus is horizontally moveable for transporting said substrates.

8. Method for handling substrates that are provided with an inner hole, including the steps of:

grasping a first substrate with an inner hole gripper;

bringing said first substrate into contact with an outer gripper;

grasping said first substrate with said outer gripper;

releasing contact between said inner hole gripper and said first substrate;

moving said inner hole gripper through said inner hole of said first substrate;

grasping a second substrate with said inner hole gripper;

releasing said second substrate;

again grasping said first substrate with said inner hole gripper;

moving said inner hole gripper relative to said outer gripper in order to bend said first substrate;

bringing a central portion of said bent first substrate into contact with said second substrate; and bringing a remainder of said first substrate into contact with said second substrate.

9. A method according to claim 8, wherein said step of bringing said first substrate into contact with said outer gripper is effected via a vertical movement.

10. A method according to claim 8, wherein said step of bringing said first substrate into contact with said outer gripper is effected by raising said inner hole gripper.

11. A method according claim 8, which includes the step of pneumatically controlling said grasping of said first and second substrates with said inner hole gripper.

12. A method according to claim 8, wherein said step of grasping said first substrate with said outer gripper is effected via a vacuum.

13. A method according claim 8, wherein rim portions of said first substrate are bent away from said second substrate.

14. A method according to claim 8, wherein said inner hole gripper and said outer gripper are moved horizontally.

* * * * *